United States Patent
Li et al.

(10) Patent No.: US 10,880,821 B2
(45) Date of Patent: Dec. 29, 2020

(54) INITIAL CELL SCANNING BASED ON CONTEXT INFORMATION

(71) Applicant: INTEL CORPORATION, Santa Clara, CA (US)

(72) Inventors: Honggang Li, Beijing (CN); Jia Li, Beijing (CN); Weijie Sun, Beijing (CN); Liang Zhang, Beijing (CN); Qingyun Guo, Beijing (CN); Hongxing Yin, Beijing (CN); Yifan Yu, Beijing (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/531,355

(22) PCT Filed: Dec. 26, 2014

(86) PCT No.: PCT/CN2014/095040
§ 371 (c)(1),
(2) Date: May 26, 2017

(87) PCT Pub. No.: WO2016/101238
PCT Pub. Date: Jun. 30, 2016

(65) Prior Publication Data
US 2017/0332313 A1 Nov. 16, 2017

(51) Int. Cl.
*H04W 48/16* (2009.01)
*H04W 48/18* (2009.01)
*H04W 64/00* (2009.01)

(52) U.S. Cl.
CPC ........... *H04W 48/16* (2013.01); *H04W 48/18* (2013.01); *H04W 64/006* (2013.01)

(58) Field of Classification Search
CPC ....... H04W 48/18; H04W 8/12; H04W 8/183; H04W 88/06; H04W 36/0083; H04W 36/18
(Continued)

(56) References Cited

U.S. PATENT DOCUMENTS

| 7,509,125 B2 * | 3/2009 | Vuong | ................. H04W 48/18 455/434 |
| 2006/0211421 A1 * | 9/2006 | Vuong | ................. H04W 48/18 455/434 |

(Continued)

FOREIGN PATENT DOCUMENTS

| CN | 1784046 A | 6/2006 |
| CN | 102017720 A | 4/2011 |

(Continued)

OTHER PUBLICATIONS

International Search Report and Written Opinion dated Sep. 17, 2015 from International Application No. PCT/CN2014/095040, 11 pages.

(Continued)

*Primary Examiner* — Huy C Ho
(74) *Attorney, Agent, or Firm* — Schwabe, Williamson & Wyatt, P.C.

(57) ABSTRACT

A user equipment comprises one or more antennas, a processor to communicate with an enhanced Node B (eNB) of an Internet Protocol (IP) based wireless communication network via the antenna; and a storage medium coupled to the processor. The storage medium having instructions stored thereon, that if executed by the processor, result in: collecting, at a first location, context information associated with a second location, wherein the user equipment is to roam from the first location to the second location; predicting the second location of the user equipment based on the context information; determining a set of one or more (Continued)

candidate frequency bands relating to the second location; and performing, at the second location, an initial cell scan based on the set of one or more candidate frequency bands to search for a frequency band that is supported by the user equipment, in response that the user equipment roams to the second location.

15 Claims, 6 Drawing Sheets

(58) Field of Classification Search
USPC .................................................. 455/432.1
See application file for complete search history.

(56) References Cited

U.S. PATENT DOCUMENTS

| 2008/0140313 | A1* | 6/2008 | Jung | G01C 21/3476 |
| | | | | 701/533 |
| 2012/0079084 | A1 | 3/2012 | Forssell et al. | |
| 2013/0145024 | A1* | 6/2013 | Cao | H04L 67/22 |
| | | | | 709/224 |

FOREIGN PATENT DOCUMENTS

| CN | 102521019 A | 6/2012 |
| CN | 102870473 A | 1/2013 |
| CN | 103202070 A | 7/2013 |
| CN | 103221948 A | 7/2013 |
| EP | 1641292 A1 | 3/2006 |
| EP | 1950987 A1 | 7/2008 |
| EP | 2298005 A1 | 3/2011 |
| JP | 2003264565 A | 9/2003 |
| JP | 3636696 B2 | 4/2005 |
| WO | 2012/022021 A1 | 2/2012 |

OTHER PUBLICATIONS

European Patent Office—Extended European Search Report dated Aug. 17, 2018 from European Patent Application No. 14908806.4, 19 pages.

European Patent Office—Partial Supplementary European Search Report dated May 7, 2018 from European Patent Application No. 14908806.4, 24 pages.

European Patent Office—Article 94(3) dated Aug. 1, 2019 from European Patent Application No. 14908806.4, 8 pages.

* cited by examiner

INITIAL CELL SCANNING BASED ON CONTEXT INFORMATION

CROSS REFERENCE TO RELATED APPLICATIONS

The present application is a national phase entry under 35 U.S.C. § 371 of International Application No. PCT/CN2014/095040, filed Dec. 26, 2014, entitled "INITIAL CELL SCANNING BASED ON CONTEXT INFORMATION," which designated, among the various States, the United States of America and is hereby incorporated by reference.

BACKGROUND

Wireless mobile communication technology utilizes various standards and protocols for communication between wireless devices, e.g., a base transceiver station (BTS) and a wireless mobile device. In the third generation partnership project (3GPP) long term evolution (LTE) systems, the BTS is a combination of an evolved Node Bs (eNode Bs or eNBs) and Radio Network Controllers (RNCs) in a Universal Terrestrial Radio Access Network (UTRAN), which communicates with the wireless mobile device, known as a user equipment (UE).

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
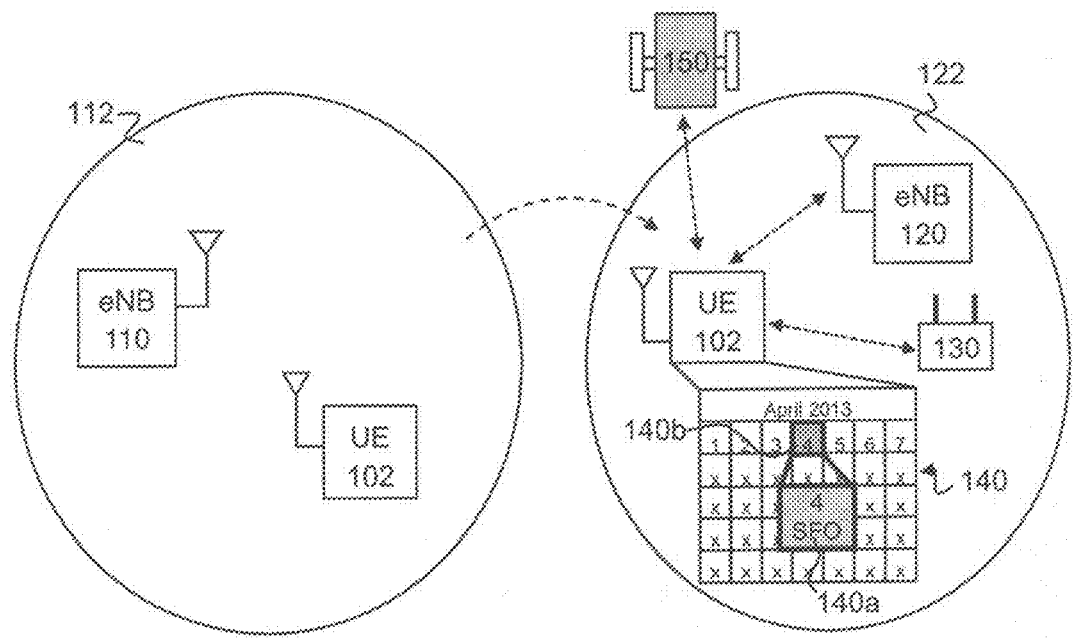
FIG. 1 schematically illustrates an example of a wireless environment according to an embodiment.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). Some examples of a machine-readable medium may include read only memory (ROM); random access memory (RAM); magnetic disk storage media; optical storage media; flash memory devices or the like. Some transitory examples of a machine-readable medium may comprise electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

While example embodiments may be described herein in relation to cellular networks in general, other types of wireless networks where similar advantages may be obtained can be used. Such networks may include, but are not limited to, broadband wireless access (BWA) networks, wireless local area networks (WLANs), wireless personal area networks (WPANs) and/or wireless wide area networks (WWANs) and the like.

The following embodiments may be used in applications including transmitters and receivers of a mobile wireless radio system. Radio systems included within the scope of the embodiments may include, but are not limited to, network interface cards (NICs), network adaptors, base stations, access points (APs), relay nodes, evolved node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and existing and future arising systems which may be related in nature and to which the principles of the embodiments could be suitably applied.

FIG. 1 schematically illustrates a wireless mobile device such as a user equipment (UE) that may utilize context information to speed up an initial scanning process. As shown in FIG. 1, UE 102 may wirelessly communicate with one or more wireless devices, e.g., in a wireless communication network. In various embodiments, the wireless communication network may comprise a cellular network or any other wireless communication network. Examples of wireless devices may comprise a base station 110 that may serve a cell 112 and/or a base station 120 may serve another cell 122. The base station 110 may provide radio resources across multiple carriers to UE 102 if UE 102 is in the cell 112. Similarly, the base station 120 may provide radio resources across multiple carriers to UE 102 if UE 102 locates in the cell 122. In various embodiments, the UE 102 may be a subscriber station that may concurrently utilize one or more radio resources across multiple carriers such as in a carrier aggregation scheme using protocols compatible with the 3GPP standards including, for example, Long Term Evolution (LTE) including LTE Advanced or variants thereof.

In various embodiments, the UE 102 may support multiple-input and multiple-output (MIMO) communication with at least one base station. For example, UE 102 may comprise one or more antennas to concurrently utilize one or more radio resources of one or more respective component carriers. The UE 102 may communicate using Orthogonal Frequency Division Multiple Access (OFDMA) (e.g., downlink) and/or Single-Carrier Frequency Division Multiple Access (SC-FDMA) (e.g., uplink) in some embodiments. In various embodiments, the UE 102 may be a cellular phone, a mobile phone, a personal computer (PC), a notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras and the like, personal computing accessories and all existing and future arising wireless mobile devices which may be related in nature and to which the principles of the embodiments could be suitably applied.

In various embodiments, the base stations 110 and/or 120 may be evolved Node-B (eNB) stations. For example, a base station may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the UE 102. The eNB stations 110 and/or 120 may each include one or more antennas, one or more radio modules to modulate and/or demodulate signals transmitted or received on an air interface, and one or more digital modules to process signals transmitted and received on the air interface.

In some embodiments, in response to powering on, the UE 102 may execute an initial cell scan to search for a set of one or more candidate frequency bands that may be supported by the UE 102. The UE 102 may go through the set of one or more candidate frequency bands one by one until a frequency band that is supported by the UE 102 is detected. In some examples, the UE 102 may spend a certain amount of time and a battery power for a cell scan with one or more frequency bands. In some other examples, the UE 102 may perform the initial scanning repeatedly and may use up the battery power, e.g, for a travel in a mountainous area where there is no or less wireless network coverage.

As shown in FIG. 1, in some embodiments, the UE 102 may utilize wireless fidelity (WiFi), global positioning system (GPS), Bluetooth, sensors and/or any other positioning technologies to perform a positioning process physically to obtain current location information of the UE 102. For example, the UE 102 may comprise a WiFi communication module (not shown) that may communicate with a WiFi router 130 to find, e.g., an access point with a service set identification (SSID) of a current location of the UE 102, e.g., "San Francisco International Airport". In some embodiments, the UE 102 may comprise a GPS module (not shown) to communicate with, e.g., a satellite 150 to obtain the current location information of the UE 102. In some other embodiments, the UE 102 may obtain the current location information of the UE 102, e.g., via a Bluetooth module (not shown). In some other embodiments, the UE 102 may utilize one or more sensors (not shown) to obtain the current location information of the UE 102. The UE 102 may obtain a set of one or more target or candidate frequency bands associated with the current location of the UE 102 based on the obtained current location information. Although FIG. 1 illustrates that the UE 102 may obtain the candidate frequency bands based on WiFi and/or GPS positioning, the UE 102 may use any other positioning component(s), e.g., sensors and/or Bluetooth units to complete the physical positioning process.

In some embodiments, as shown in FIG. 1, at least initially, the UE 102 may have an established wireless connection with eNB 110. For example, the UE 102 may communicate with the eNB 110 if the UE 102 is within the cell 112 of the eNB 110 at a first location, e.g, Beijing. The UE 102 may communicate with eNB 120 if the UE 102 roams or moves to the cell 122 of the eNB 120 at a second location, e.g., San Francisco. Although one UE 102 is illustrated in FIG. 1, in some embodiments, one or more UEs may locate in a cell of an eNB.

In various embodiments, the UE 102 may predict or indicate in advance a next or potential location where the UE 102 is to go based on context information associated with the next location In some embodiments, the context information may be stored on a storage medium (not shown) of the UE 102. For example, as shown in FIG. 1, the context information may comprise, e.g., location information 140a and/or time information 140b of a calendar 140 that may relate to a future trip of a user of UE 102. The calendar 140 that comprises the location information 140a and/or time information 140b may be stored in the storage medium of the UE 102. In some embodiments, the context information may comprise a map, a map search result and/or any other map information that may relate to the next or potential location of the UE 102. For example, the UE 102 may collect the map information via a user request for map information. For another example, the UE 102 may search a map online/offline to obtain the map information. In some embodiments, the UE 102 may store the obtained map information on the memory of the UE 102.

In some embodiments, the context information may comprise application data or information from one or more applications that may run on the UE 102. In some other embodiments, the application information may comprise information on time, event/meeting, travel and/or location that may be used to predict the next location of the UE 102. For example, the UE 102 may obtain the travel information in response to executing one or more applications, e.g., a calendar application, a travel planning/scheduling application and/or any other applications that may contain the travel information and/or any other context information. In some other embodiments, the context information may comprise a timer alert, e.g., in one or more of the applications. The UE 102 may obtain the application data in response that the timer alert triggers an indication of the application information periodically or at a predetermined time.

In some embodiments, the context information may comprise cloud information associated with the next location of the UE 102 and may be stored in a cloud space. The UE 102 may obtain or download the cloud information from the cloud space. In another example, the UE 102 may obtain the context information from one or more cloud-based applications. In some other embodiments, the context information may comprise a message and/or advertisement that may be broadcast by one or more other wireless devices.

The UE 102 may predict or indicate the next location, e.g., a next stop geo location, based on the collected context information. For example, as shown in FIG. 1, the UE 102 may predict the next location of the UE 102 to be "San Francisco" based on a record of "business travel in San Francisco on April 4th" on a calendar 140. The UE 102 may obtain a set of one or more target or candidate frequency bands or any other radio data associated with the predicted location from a radio service provider with/without any physical positioning via WiFi, GPS, Bluetooth, sensor, etc.

As shown in FIG. 1, in response to roaming from a first cell 112 at the first location, e.g., Beijing to a second cell 122 at the second location, i.e., San Francisco, the UE 102 may perform a scanning on the set of one or more candidate frequency bands corresponding to the predicted next location of the UE 102. In some other embodiments, the UE 102 may obtain a set of one or more frequency bands based on location/positioning information collected in a physical positioning process, e.g., through WiFi, GPS, Bluetooth, sensors, etc. The UE 102 may perform a scanning on the set of frequency bands that are obtained based on the collected location/positioning information.

Figure 2:
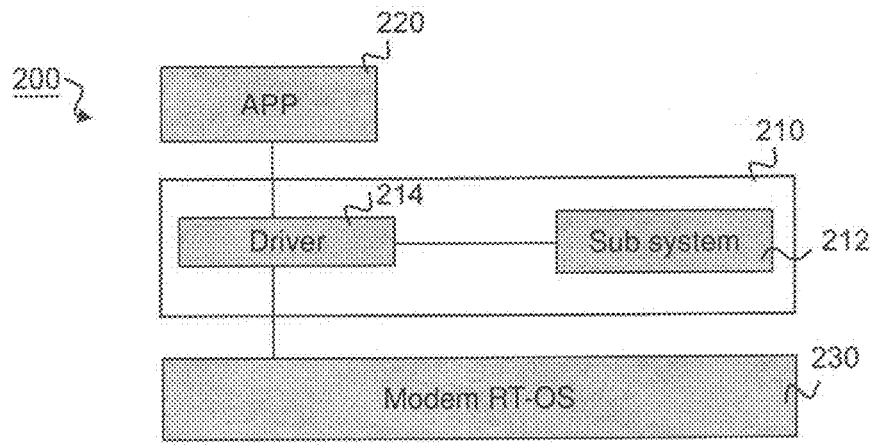
FIG. 2 schematically illustrates an example of a block diagram of a system according to an embodiment.

FIG. 2 schematically illustrates an example system that may be used by a user equipment, e.g., UE 102, according to some embodiments. As shown in FIG. 2, the system 200 may comprise an operating system (OS) 210 that may be stored in a memory (not shown) of the UE 102. In some embodiments, the OS 210 may comprise one or more instructions and/or applications that may be executed by a processor (e.g., 604 of FIG. 6) of the UE 102. In some embodiments, the OS 210 may be an Android OS, iOS, Mac OS or any other OS that may be used in a wireless mobile device.

In various embodiments, the OS 210 may comprise a sub-system 212 that may be executed by the processor of the UE 102 to collect context information on where the UE 102 is to go based on, e.g., application information of an application 220 and/or location information from a modem receive/transmit (RT) operating system 230. In various embodiments, the processor of the UE 102 may execute sub-system 212 to obtain/access the application information and/or the location information via a driver 214 in the OS 210. In some other embodiments, the UE 102 may obtain the context information from a cloud space or by executing a cloud based application.

In some embodiments, the application 220 may comprise a calendar application. The calendar application may comprise application information relating to a travel of a user of the UE 102. In some embodiments, the processor of the UE 102 may execute the calendar application to access the application information to obtain the travel information of the user. In some embodiments, the processor may execute the application 220 to search for a map online/offline and obtain a map search result or any other map information. In some other embodiments, the processor of the UE 102 may execute the modem RT OS 230 to obtain the location information, e.g., SSID, of an access point in response to communicating with a WiFi router via a WiFi unit in the UE 102. In some embodiments, the sub-system 212 may have one or more instructions that may be executed by the processor to provide GPS location information.

Figure 3:
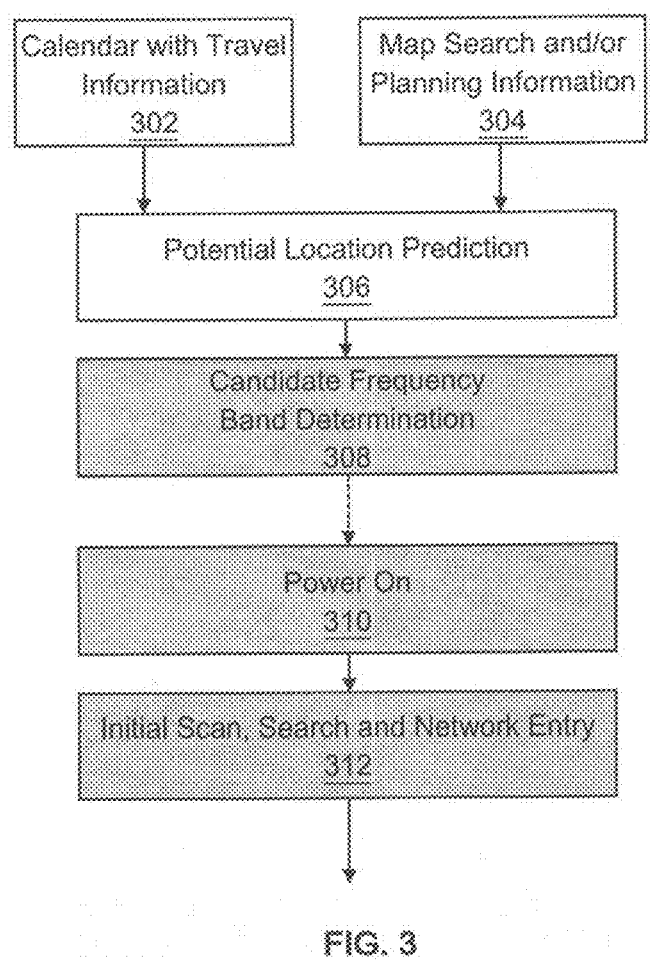
FIG. 3 schematically illustrates a flow chart of a method according to an embodiment.

FIG. 3 illustrates an example of a flow that may be used by a UE, e.g., 102. In various embodiments, the flow may be used in location prediction or indication in initial frequency band scanning. As shown in FIG. 3, in block 302, the UE 102 may execute a calendar application to obtain travel information and/or calendar information included in the calendar application. For example, as shown in FIG. 1, the stored travel information may comprise destination information of the user, e.g, "San Francisco", and/or time information, e.g., "Apr. 4, 2013", associated with a travel schedule of a user of the UE 102. In block 304, the UE 102 may obtain map information associated with a map search and/or planning information, e.g., associated with a trip plan. For example, the UE 102 may search for a map of San Francisco online/offline to obtain the map information such as a map search result. The UE 102 may obtain the planning information such as destination information and/or time information included in the trip plan.

Although FIG. 3 illustrates that the UE 102 may obtain the travel information, calendar information, the destination information, the map information and/or the planning information that may indicate a next location of the UE 102, in some other embodiments, any other context information may be utilized by the UE 102. Examples of the context information may further comprise one or more from a group of application information, event/meeting information, cloud data and/or any other information that may relate to the next location of the UE 102. In some embodiments, the UE 102 may obtain the context information periodically and/or in response to a timer alert. In some other embodiments, the UE 102 may obtain the context information from a cloud space or a cloud-based application.

As shown in FIG. 3, in block 306, the UE 102 may predict or indicate a next location where the UE 102 is to go based on the context information obtained in block 302 and/or 304. In block 308, the UE 102 may determine a set of one or more target or candidate frequency bands for the next location predicted in block 306.

In block 310, the UE 102 may be powered on in response to roaming/moving from a first location, e.g., Beijing, to the next location, e.g., San Francisco that is predicted in block 308. In some embodiments, the UE 102 may not be powered off when roaming from a first location to a second location.

In block 312, in response to powering on, the UE 102 may perform an initial cell scan on the set of one or more candidate frequency bands determined in block 308 to search for a frequency band that is supported by the UE 102 from the set of candidate frequency bands. In some embodiments, the UE 102 may obtain the predicted next location based on the context information to reduce the number of the candidate frequency bands that are to be scanned in the initial scanning process. In block 312, the UE 102 may further perform network entry in response to finding in the initial cell scanning at least one candidate frequency band, e.g., that is accessible and supported by the UE 102. For example, the UE 102 may receive one or more broadcast channel messages, e.g., from eNB 120 and may transmit a channel synchronization access request to the eNB 120 to perform the network entry.

Figure 4:
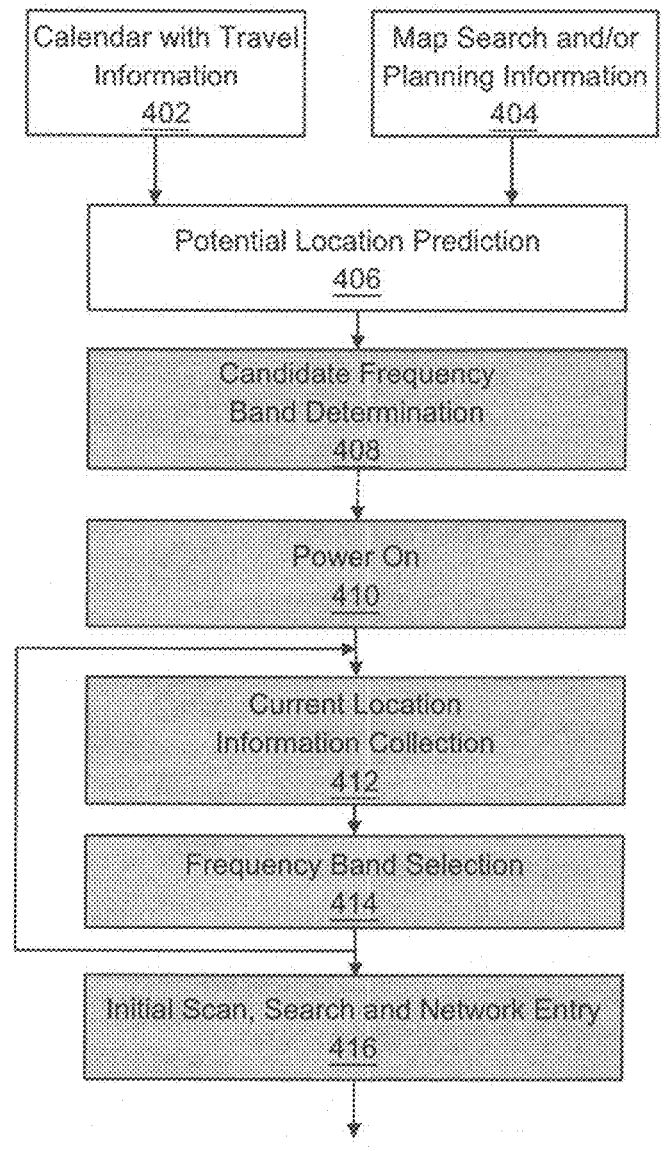
FIG. 4 schematically ales a flow chart of a method according to an embodiment.

FIG. 4 illustrates another example of a flow that may be used by the UE 102. In various embodiments, the flow may be used in location prediction or indication in initial cell scanning. As shown in FIG. 4, the flow is similar to that of FIG. 3 except that the flow of FIG. 4 may utilize the location/positioning information obtained through physical positioning, e.g., via a communication by local components such as WiFi units, Bluetooth antenna ports, sensors and/or GPS modules, etc. In some embodiments, in block 412, in response to powering on, the UE 102 may collect information on a current location of the UE 102 via a physical positioning process. For example, the UE 102 may utilize WiFi module, Bluetooth module, GPS module, sensors and/or other built-in components to execute the physical positioning process to obtain the current location information of the UE 102. The UE 102 may obtain the current location information based on a geo-location indication in a WiFi SSID. In some other embodiments, the UE 102 may obtain the current location information based on a message or an advertisement broadcast and/or any other signal from one or more other wireless devices. In block 414, the UE 102 may select one or more frequency bands from the set of candidate frequency bands obtained in block 408 based on the current location obtained in block 412, e.g., via the physical positioning. In some embodiments, the UE 102 may execute the physical positioning process in block 412 to obtain the current location information that may be used to reduce the number of the candidate frequency bands determined in block 408.

While the methods of FIGS. 3 and 4 are illustrated to comprise a sequence of processes, the methods in some embodiments may perform illustrated processes in a different order.

While FIG. 4 illustrates blocks 412 and 414, in some embodiments, blocks 412 and 414 may not be triggered if the UE 102 is able to predict the next location in block 406. In some other embodiments, blocks 412 and 414 may not be triggered if a number of the set of candidate frequency bands determined in block 408 does not exceed a threshold. In yet some other embodiments, the initial scanning of block 416 may occur at the same time of blocks 412 and/or 414, e.g., the physical positioning process. For example, if the initial cell scanning of block 416 fails, the UE 102 may perform a further cell scanning on the frequency bands obtained based on the current location information, e.g., as shown in blocks 412 and/or 414.

Figure 5:
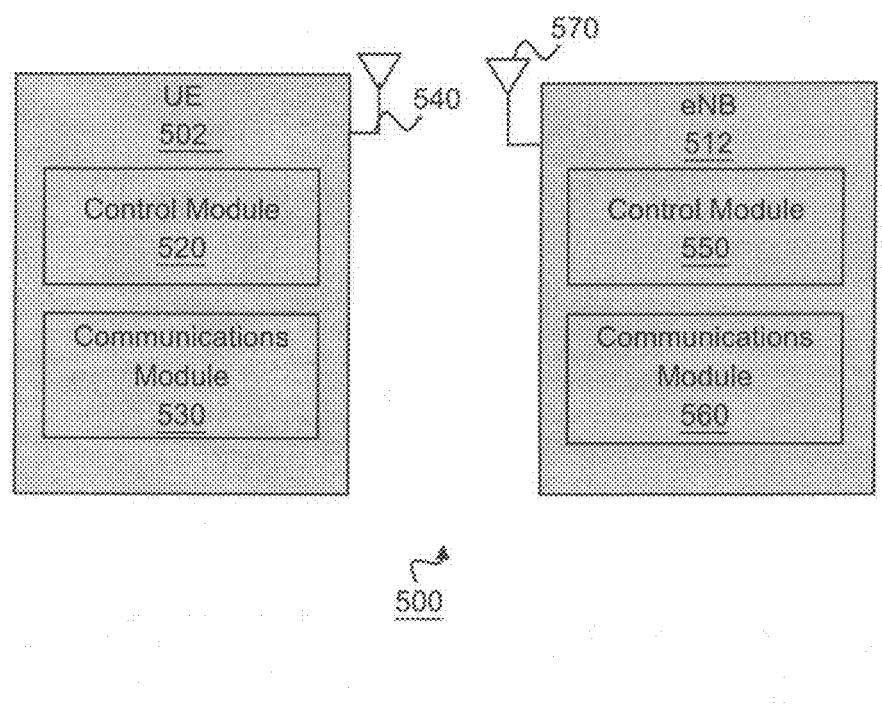
FIG. 5 schematically illustrates an example of a block diagram of a wireless communication network including a user equipment (UE) and an evolved Node Bs (eNBs) in accordance with an embodiment.

FIG. 5 illustrates a wireless communication network 500 in accordance with various embodiments. Wireless communication network 500 (hereinafter "network 100") may include a base station, e.g., eNB 512, that may communicate with a UE, e.g., 502, wirelessly.

In some embodiments, UE 502 may comprise a communications module 530 and a control module 520. The communications module 530 may be further coupled with a set of one or more antennas 570 of the eNB 512 for communicating wirelessly over network 500. The UE 502 may include any suitable number of antennas 540. In some embodiments, the UE 502 may include at least as many antennas 540 as a number of simultaneous spatial layers or streams received by the UE 502 from the eNB 512; however, in some embodiments, the UE 502 may have a different number of antennas. The number of simultaneous spatial layers or streams may also be referred to as transmission rank, or simply rank. One or more of the antennas 540 may be alternately used as transmit or receive antennas. In some embodiments, one or more of the antennas 540 may be dedicated receive antennas or dedicated transmit antennas. In various embodiments, the control module 530 may perform the flows as shown in FIGS. 3 and/or 4.

As shown in FIG. 5, eNB 512 may include a communications module 560 and a control module 550 coupled with one another at least as shown in FIG. 5. The communications module 560 may be further coupled with the one or more antennas 540 of the UE 502. The communications module 560 may communicate (e.g., transmit and/or receive) with one or more UEs (e.g., UE 502). In various embodiments, the eNB 512 may include at least as many antennas 570 as a number of simultaneous transmission streams transmitted to the UE 502; however, in some embodiments, the eNB 512 may have a different number of antennas. One or more of the antennas 570 may be alternately used as transmit or receive antennas. In some embodiments, one or more of the antennas 570 may be dedicated receive antennas or dedicated transmit antennas. In some embodiments, one or more of the antennas 570 may alternate between communicating in one or more cells.

Figure 6:
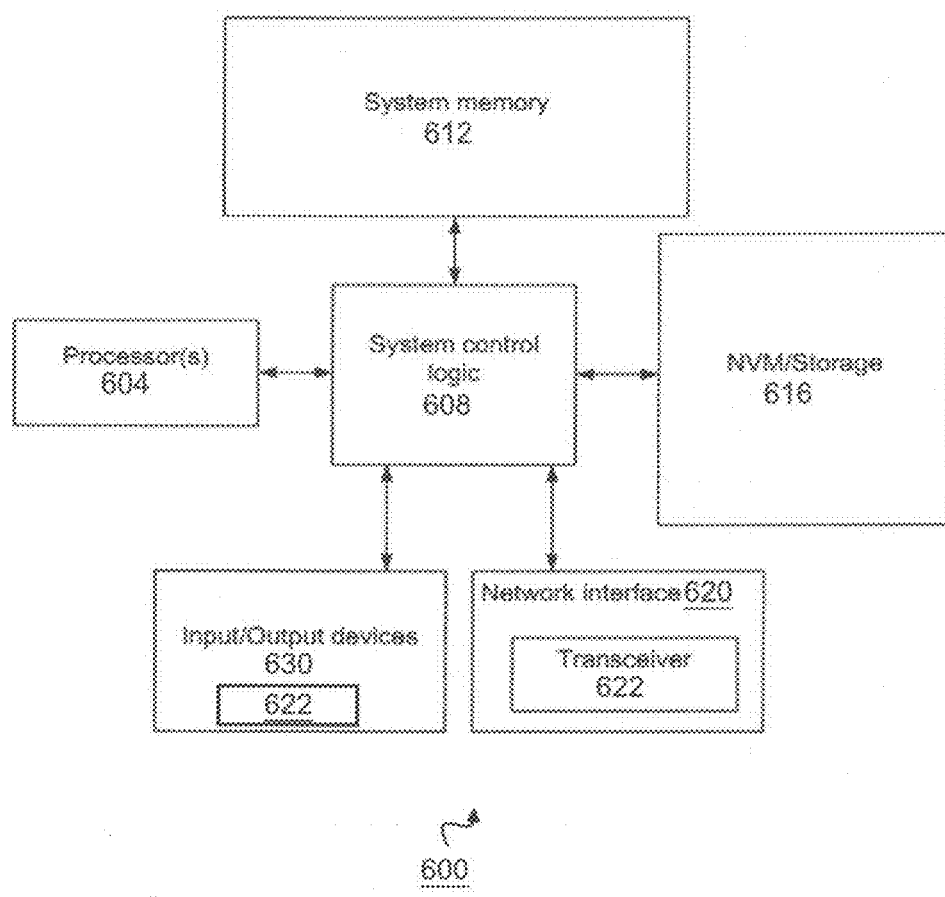
FIG. 6 schematically depicts an example system in accordance with an embodiment.

FIG. 6 illustrates an example of a system 600 according to some embodiments. The system 600 may comprise one or more processor(s) 604, system control logic 608 coupled with at least one of the processor(s) 604, system memory 612 coupled with system control logic 608, non-volatile memory (NVM)/storage 616 coupled with system control logic 608, a network interface 620 coupled with system control logic 608, and input/output (I/O) devices 630 coupled with system control logic 608.

The processor(s) 604 may include one or more single-core or multi-core processors. The processor(s) 604 may include any combination of general-purpose processors and dedicated processors (e.g., graphics processors, application processors, baseband processors, etc.).

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620 and/or over Input/Output (I/O) devices 630.

Network interface 620 may have a transceiver 622 to provide a radio interface for system 600 to communicate over one or more network(s) and/or with any other suitable device. The transceiver 622 may implement communications module 530 or 560. In various embodiments, the transceiver 622 may be integrated with other components of system 600. For example, the transceiver 622 may include a processor of the processor(s) 604, memory of the system memory 612, and NVM/Storage of NVM/Storage 616. Network interface 620 may include any suitable hardware and/or firmware. Network interface 620 may include a plurality of antennas to provide a multiple input, multiple output radio interface. Network interface 620 for one embodiment may include, for example, a wired network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

In various embodiments, the I/O devices 630 may include user interfaces designed to enable user interaction with the system 600, peripheral component interfaces designed to enable peripheral component interaction with the system 600, and/or sensors designed to determine environmental conditions and/or location information related to the system 600.

In some embodiments, the user interfaces may include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In some embodiments, the peripheral component interfaces may include, but are not limited to, a non-volatile memory port, a universal serial bus (USB) port, an audio jack, and a power supply interface.

In some embodiments, the sensors may include, but are not limited to, a gyro sensor, an accelerometer, a proximity sensor, an ambient light sensor, and a positioning unit, e.g., 632. In some embodiments, the positioning unit 632 may also be part of, or interact with, the network interface 620 to communicate with components of a positioning network, e.g., a global positioning system (GPS) satellite, a WiFi router, a Bluetooth antenna port.

In some embodiments, the system 600 may be a mobile device such as, but not limited to, a laptop computing device, a tablet computing device, a netbook, a smartphone, a wearable device, etc. In various embodiments, system 600 may have more or less components, and/or different architectures. In various embodiments, the system 600 may comprise a mobile device, such as a user equipment (UE), a mobile station (MS), a mobile wireless device, a mobile communication device, a smartphone, a wearable device, a tablet, a handset, or other type of mobile wireless device. The mobile device may include one or more antennas configured to communicate with a base station (BS), an evolved Node B (eNB), or other type of wireless wide area network (WWAN) access point. While two antennas are shown, the mobile device may have between one and four or more antennas.

In various embodiments, the mobile device may communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

Figure 7:
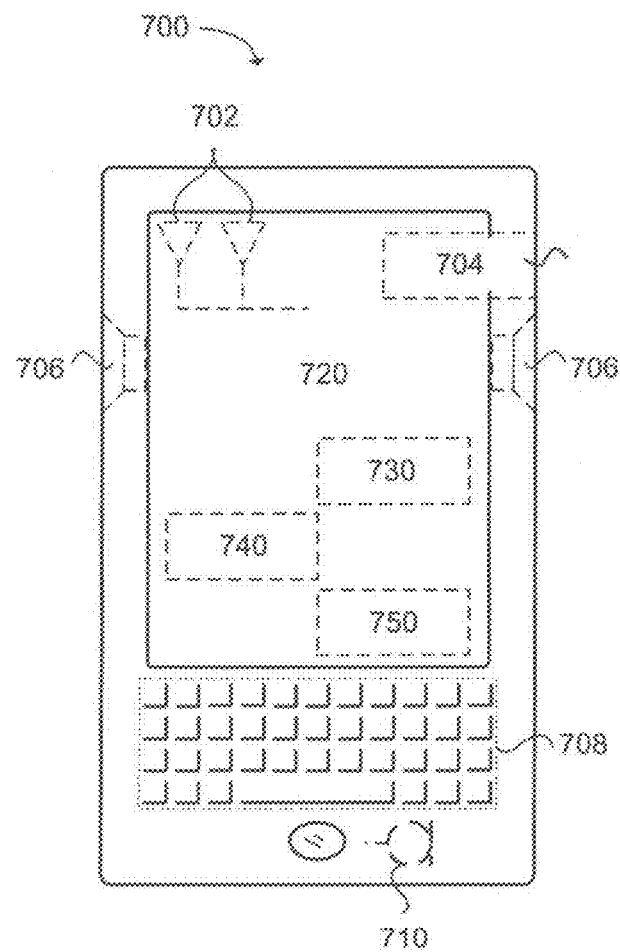
FIG. 7 illustrates an example of a block diagram of a mobile communication device in accordance with an embodiment.

FIG. 7 provides an example illustration of a mobile device 700, such as a user equipment (UE), a mobile station (MS), a mobile wireless device, a mobile communication device, a tablet, a handset, or other type of mobile wireless device. The mobile device 700 may include one or more antennas 702 to communicate with a base station (BS), an evolved Node B (eNB), or other type of wireless wide area network (WWAN) access point. While two antennas 702 are shown, the mobile device 700 may have a different number of antennas. The mobile device 700 may communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or any other wireless standards. The mobile device 700 may communicate using separate antennas for each wireless communication standard or shared antennas for multiple wireless communication standards. The mobile device 700 may communicate in a wireless local area network (WLAN), a wireless personal area network (WPAN), and/or a wireless wide area network (WWAN).

The mobile device 700 may comprise a microphone 710 and one or more speakers 706 that may be used for audio input and output from the mobile device 700. Examples of display screen 720 may be a liquid crystal display (LCD) screen, or other type of display screen such as an organic light emitting diode (OLED) display. In some embodiments, the display screen 720 may be a touch screen. The touch screen may use capacitive, resistive, or any other type of touch screen technology. An application processor 730 and a graphics processor 740 may be coupled to internal memory 750 to provide processing and/or display capabilities. A non-volatile memory port 704 may also be used to provide data input/output options to a user and/or expand memory capabilities of the mobile device 700. A keyboard 708 may be integrated with the mobile device 700 or wirelessly connected to the mobile device 700 to provide additional user input; however, in some embodiments, the keyboard 708 may not be required. For example, a virtual keyboard may be provided for a touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "example" means that a particular feature, structure, or characteristic described in connection with the example is included in at least one embodiment of the present invention. Thus, appearances of the phrases "for example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as an equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as equivalents of one another, but are to be considered as separate and autonomous representations of the present invention.

Furthermore, the described features, structures, or characteristics may be combined in any suitable manner in one or more embodiments. In the following description, numerous specific details are provided, such as examples of search spaces, to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

While the methods of FIGS. 3 and 4 are illustrated to comprise a sequence of processes, the methods in some embodiments may perform illustrated processes in a different order.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A user equipment, comprising:
   one or more antennas,
   a processor to communicate with an enhanced Node B (eNB) of an Internet Protocol (IP) based wireless communication network via the antenna; and
   a storage medium coupled to the processor, the storage medium having instructions stored thereon, that if executed by the processor, result in:
      receiving, as input from a user equipment, search criteria for a map search;
      providing results of the map search to the user;
      collecting, at a first location, context information associated with a second location, wherein the context information is based on results of a map search by the user equipment;
      predicting, based on the context information and prior to a power-off event, that the user equipment is to be in a second location after a power-on event that occurs after the power-off event;
      determining a set of one or more candidate frequency bands relating to the second location; and
      performing, at the second location after the power-on event, an initial cell scan based on the set of one or more candidate frequency bands to search for a frequency band that is supported by the user equipment.

2. The user equipment of claim 1, wherein the storage medium has instructions stored thereon, that if executed by the processor, further result in:
   storing the context information associated with the second location on the storage medium.

3. The user equipment of claim 1, wherein the storage medium has instructions stored thereon, that if executed by the processor, further result in:
   executing one or more applications to collect the context information, wherein the one or more applications each comprises application data relating to the second location of the user equipment.

4. The user equipment of claim 1, further comprising:
   a positioning unit coupled to the processor, and
   wherein the storage medium has instructions stored thereon, that if executed by the processor, further result in:
      collecting, from the positioning unit, positioning information relating to the second location in response that the user equipment roams to the second location;
      selecting a candidate frequency band from the set of one or more frequency bands based on the positioning information; and performing the initial cell scan based on the selected candidate frequency band.

5. The user equipment of claim 4, wherein the positioning unit comprises one or more from a group comprising a global positioning system (GPS) module; a wireless fidelity (WiFi) module; a Bluetooth module and a sensor.

6. A method, comprising:
receiving, as input from a user of a user equipment, search criteria for a map search;
providing results of the map search to the user;
collecting, at a first location, context information associated with a potential location where the context information is based on the results of the map search by the user equipment;
predicting, based on the context information and prior to a power-off event, that the user equipment is to be in the potential location after a power-on event that occurs after the power-off event;
determining a first set of one or more candidate frequency bands relating to the potential location; and
performing, at the potential location after the power-on event, an initial cell scan based on the set of one or more candidate frequency bands to search for a frequency band that is supported by the user equipment.

7. The method of claim 6, further comprising:
storing the context information on a storage medium of the user equipment.

8. The method of claim 6, further comprising:
performing a physical positioning to obtain positioning information relating to the potential location in response that the user equipment roams to the potential location and determining the set of one or more candidate frequency bands relating to the potential location fails;
selecting a second set of one or more candidate frequency bands based on the positioning information; and
performing the initial cell scanning based on the second set of one or more candidate frequency bands to search for a frequency band that is supported by the user equipment.

9. The method of claim 8, wherein the positioning information comprises one or more from a group comprising global positioning system (GPS) information; service set identification (SSID) information; Bluetooth positioning information and sensor positioning information; an advertisement message on a WiFi or Bluetooth antenna port.

10. One or more non-transitory computer-readable media having instructions stored thereon, that, when executed cause a user equipment (UE) to:
receiving, as input from a user of the UE, search criteria for a map search;
providing results of the map search to the user;
obtain, at a first location, location information of a destination where the context information is based on results of a map search by the UE;
predict, based on the location information and prior to a power-off event, that the UE is to be in the destination after a power-on event that occurs after the power-off event;
determine a set of one or more candidate frequency bands relating to the destination; and
perform, at the destination after the power-on event, an initial cell scan based on the set of one or more candidate frequency bands to search for a frequency band that is supported by the user equipment.

11. The one or more non-transitory computer-readable media of claim 10, having instructions stored thereon, that, when executed cause a user equipment (UE) further to:
obtain positioning information of the destination via a physical positioning in response that the user equipment roams to the destination;
select a candidate frequency band from the set of one or more frequency bands based on the positioning information; and
perform the initial cell scan based on the selected candidate frequency band.

12. The one or more non-transitory computer-readable media of claim 11, having instructions stored thereon, that, when executed cause a user equipment (UE) further to:
trigger the physical positioning in response to determining that a number of the set of the one or more candidate frequency bands exceeds a threshold.

13. The one or more non-transitory computer-readable media of claim 11, having instructions stored thereon, that, when executed cause a user equipment (UE) further to:
trigger the physical positioning in response to determining that the initial cell scan fails.

14. The one or more non-transitory computer-readable media of claim 10, wherein the positioning information comprises one or more from a group comprising global positioning system (GPS) information; service set identification (SSID) information; Bluetooth positioning information and sensor positioning information.

15. The one or more non-transitory computer-readable media of claim 10, having instructions stored thereon, that, when executed cause a user equipment (UE) further to:
trigger a physical positioning to obtain positioning information on the destination in response to determining that the initial cell scan fails;
select a second set of one or more candidate frequency bands from the set of one or more candidate frequency bands based on the positioning information; and
perform a second initial cell scan based on the selected candidate frequency band.

* * * * *